Figure 1:
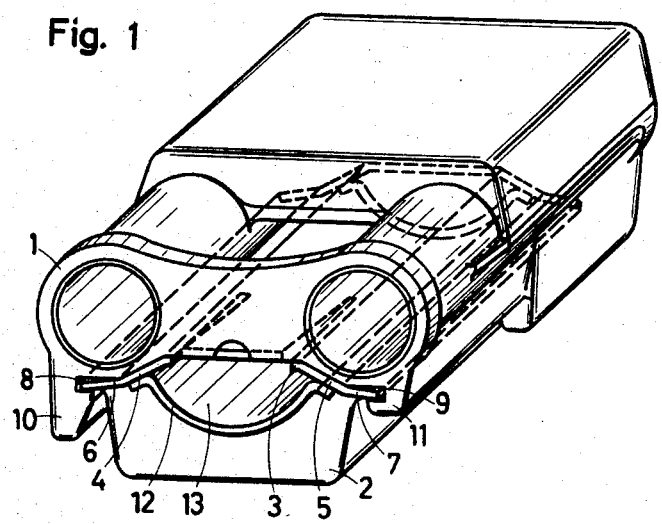
Figure 2:
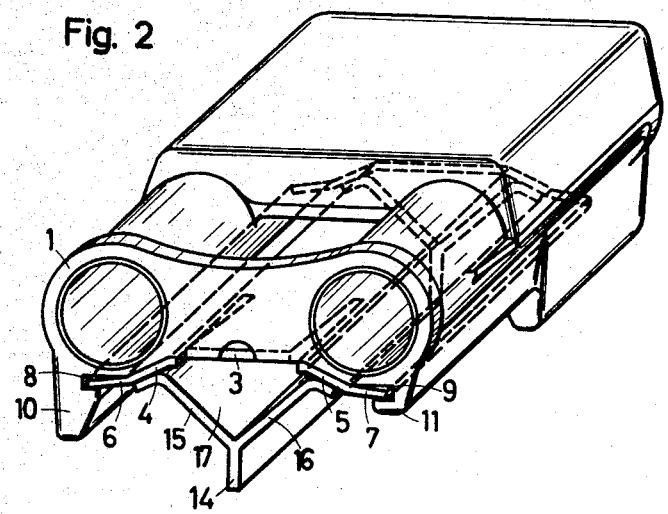

Sept. 5, 1967   O. KÖRNER ET AL   3,339,987
TRACK LINK UNITS
Filed Aug. 27, 1964

Inventors:
Otto Körner
Otto Ley 3,339,987
TRACK LINK UNITS
Otto Körner and Otto Ley, Remscheid, Germany, assignors to Firma Diehl, Remscheid, Germany, a German kommanditgesellschaft
Filed Aug. 27, 1964, Ser. No. 392,519
Claims priority, application Germany, Sept. 14, 1963,
D 42,477
3 Claims. (Cl. 305—36)

This invention relates to a track link, for a tracked vehicle, fitted with an auxiliary ground-engageable part mounted on a carrier part. According to the specific embodiment of this invention, said auxiliary part is a pad. The carrier part may be arranged to be easily detachable from the link.

The heretofore known pads of the type involved lie flat on carrier plates. This entails an important drawback in cases where the track link is fitted with additional runners enclosing the pad, which are used under unfavourable ground conditions in place of pads in order to increase the adherence of the endless track. As the pads protrude beyond the runners in order to protect the roadway, they must have a sufficient thickness. In actual practice, however, as the speed increases, the compacting taking place in the pads due to driving over uneven ground, as well as the heat thus generated, increase to such an extent that the pads become prematurely unserviceable.

An object of the invention, therefore, is to eliminate this drawback.

According to the invention, a track link for a tracked vehicle is fitted with an auxiliary ground-engageable part mounted on a carrier part, and is characterized in that there is provided, at that side of the carrier part which faces the auxiliary ground-engageable part, a hollow section which forms a bearer for the said auxiliary ground-engageable part.

It is possible, when using a pad as a ground-engageable part in an arrangement in accordance with the invention, to reduce the thickness of the pad considerably, at the same time maintaining its height in relation to runners of the kind mentioned above, resulting in compacting in the pad, and the heat thus generated being reduced, and the lifetime of the pad being, therefore lengthened.

A track link with a pad attached to a plate is already known which, due to its curvature, forms a cavity with the plate. This version, however, presents a risk in as much as the pads are liable to bend into the cavities which, when using track links with runners, may result in the runners becoming operative when they are not intended to do so.

The invention is illustrated by way of example in the accompanying drawing showing an isometric view of a track link fitted with a pad in conformity with the present invention.

The track link 1 shown in the drawing is fitted with a flexible, soundproof pad 2 secured to a plate 3. The plate 3 has two marginal portions 4 and 5 extending outwardly from the central portion of the plate and continuing in the form of two lateral pre-loaded arms 6 and 7 which guide the plate in two oppositely located grooves 8 and 9 of the track link 1. The track link 1 is provided with two runners 10 and 11 at opposite side edges of the pad 2. A part 12 with turned-out longitudinal edges, and of a bowed shape in cross-section is firmly attached to the plate 3 which, together with the part 12, forms a hollow section 13 extending in the direction of the longitudinal axis of the plate 3 and approximately over the width of the pad 2. This hollow section serves essentially as a seat for the pad 2.

We claim:
1. A track link unit provided with groove means spaced from each other in the longitudinal direction of said link, ground engaging rubber pad means, and a hollow body including plate means and also including an arched sheet metal part welded to said plate means and having said ground engaging rubber pad means vulcanized thereto, said plate means detachably engaging said groove means for securing said hollow body together with said ground engaging rubber pad means to said track link.

2. A track link unit which comprises: a track link, provided with opposing groove means spaced from each other in the longitudinal direction of the link, a plate member having opposite side edges detachably engaged in said grooves, an arched wall member integrally fixed to said plate member between said side edges to form an elongated hollow body extending generally parallel to said groove means, and ground engaging means fixed on the outer surface of said wall member.

3. The structure of claim 2 wherein the ground engaging means is a rib fixed on said arched wall member extending generally parallel to said side edges.

References Cited
UNITED STATES PATENTS
2,686,697  8/1954  Baker _____ 305—35
2,687,923  8/1954  Proske _____ 305—36

FOREIGN PATENTS
602,968  8/1960  Canada.
676,316  6/1939  Germany.
678,460  7/1939  Germany.
818,523  8/1959  Great Britain.

OTHER REFERENCES
Eichweber: German printed application No. 1,137,333, pub. Sept. 27, 1962, class 305–35 (1 sht. dwg.—3 pp. spec.).

BENJAMIN HERSH, Primary Examiner.
R. J. JOHNSON, Assistant Examiner.